United States Patent
Dickerson

[15] 3,687,407
[45] Aug. 29, 1972

[54] TEMPORARY PIPE SUPPORT

[72] Inventor: Burl D. Dickerson, 14355 Elm St., San Leandro, Calif. 94579

[22] Filed: Feb. 19, 1970

[21] Appl. No.: 12,741

Related U.S. Application Data

[63] Continuation-in-part of Ser. No. 742,217, July 3, 1968, abandoned.

[52] U.S. Cl. ................................... 248/59, 248/70
[51] Int. Cl. ........................... F16l 3/12, F16l 3/16
[58] Field of Search ..... 248/55, 59, 62, 68, 67.5, 327, 248/221, 245, 58

[56] References Cited

UNITED STATES PATENTS

| | | | |
|---|---|---|---|
| 462,616 | 11/1891 | Birkett | 248/55 |
| 854,568 | 5/1907 | Clark | 248/55 X |
| 1,056,028 | 3/1918 | Kehm | 248/55 |
| 1,062,373 | 5/1913 | Swan | 248/55 |
| 1,193,480 | 8/1916 | O'Day | 248/55 |
| 1,552,934 | 9/1925 | Lawrence | 248/327 |
| 1,561,850 | 11/1925 | Guttmain | 248/55 |
| 2,579,240 | 12/1951 | Masoner | 248/59 X |
| 2,816,734 | 12/1957 | Crofoot | 248/55 |
| 2,876,978 | 3/1959 | Robinson | 248/245 |
| 3,208,560 | 9/1965 | Cote | 248/59 X |

FOREIGN PATENTS OR APPLICATIONS

| | | | |
|---|---|---|---|
| 130,962 | 2/1951 | Sweden | 248/59 |
| 202,746 | 9/1959 | Austria | 248/59 |

*Primary Examiner*—Chancellor E. Harris
*Attorney*—Joseph B. Gardner

[57] ABSTRACT

A device for rotatably supporting sections of electrical conduits, plumbing conduits, and like tubes and pipes during assembly thereof. The pipe support device provides a temporary support for such conduits and is adapted to be removably secured to a building component which will generally be a U-shaped channel provided for the support of such conduits. The temporary pipe support device includes an open-mouthed arcuate cradle member equipped with rollers adapted to engage the peripheral surface of a conduit so as to rotatably support the same. Means are provided for removably securing the pipe support to a building component with the cradle in position to underlie a conduit to be supported thereby. The support means includes bracket structure affixed to the cradle and oriented with respect to the open mouth thereof so as to avoid interference with any conduit supported by the device. Fastener means carried by the bracket structure cooperate with the building component so as to removably secure the pipe support thereto.

6 Claims, 15 Drawing Figures

Patented Aug. 29, 1972

INVENTOR:
BURL D. DICKERSON
BY: Joseph B. Gardner
ATTORNEY

Patented Aug. 29, 1972

INVENTOR:
BURL D DICKERSON
BY
ATTORNEY

INVENTOR:
BURL D. DICKERSON
BY: Joseph D. Gardney
ATTORNEY

TEMPORARY PIPE SUPPORT

RELATED APPLICATION

This application is a continuation-in-part of my copending patent application, Ser. No. 742,217, filed July 3, 1968 which is entitled "Antifriction Pipe Assembly Support" now abandoned.

This invention relates generally to the building construction industry and, more particularly, to the installation and assembly of conduits or pipes used for the purpose of providing utility services for a building structure which, although not necessarily, may be a multiple story commercial or industrial building. As a specific example of a particular use for the invention, it has utility in the installation and assembly of the tubular pipes or conduits within which electric wiring is encased.

Common practice in the construction of modern building structures is to provide space between the floor of one level and the decorative ceiling underlying the same in which various utility conduits or pipes are located. Accordingly, assembly of such conduits requires the workman to stand on ladders or platforms while assembling the conduits which are overhead and must be supported in some manner during assembly thereof. For the permanent support of such conduits, special support channels (sometimes rods) are provided which are usually horizontally disposed and are of U-shaped construction but may be oriented with the open mouth thereof facing either upwardly or downwardly. Clamps are attached to such channel and these clamps grip or surround the conduit and afford a permanent attachment thereof to the support channel. Since the conduit sections which must be assembled in end to end relation are quite long and relatively heavy (for example, a steel pipe having a length of the order of 10 feet and a diameter of about 4 inches is not unusual), it is difficult to support two successive sections so as to maintain the same in axial alignment and permit relative rotation therebetween so the threaded adjacent ends thereof can be screwed together.

In the past, each workman has developed his own technique for temporarily supporting such pipe sections during assembling and installation thereof because there has been no versitile, reliable, and conveniently used device available for this purpose; and it is, accordingly, an object of the present invention to provide an improved temporary pipe support device adapted to fulfill the existing need.

Another object of the invention is in the provision of an improved temporary pipe support that can be quickly and easily secured to and released from a building component so as to support a pipe section therefrom, and which support device can be used repeatedly and will give long service with little or no wear or deterioration.

Still another object is that of providing an improved pipe support device of the character described which will rotatably support a pipe section for angular displacements about the longitudinal axis thereof so as to permit one pipe section to be threadedly connected to another pipe section axially aligned therewith in end to end succession, and which pipe support in certain forms thereof also accommodates longitudinal displacements of such pipe sections so as to more readily align the adjacent ends thereof for threaded interconnection.

Further objects of the invention are to provide an improved temporary pipe support of the type described which in certain forms thereof will accommodate releasable interconnection with a generally U-shaped building channel component that is horizontally disposed and is oriented so that the open mouth thereof faces upwardly or faces downwardly, that will accommodate releasable interconnection with such building channel component when it is oriented in a vertical disposition, which will accommodate pipe or conduit sections having different diameters, and which can vary the relative orientation of such pipe section and building component during temporary support of the former.

Additional objects and advantages, especially as concerns particular features and characteristics thereof, will become more apparent as the specification continues.

In a typical embodiment of the invention, the temporary pipe support device includes an open-mouthed arcuate cradle member equipped with a plurality of angularly spaced rollers adapted to support a generally cylindrical building conduit on the peripheral surface thereof for rotational displacements about its longitudinal axis. Since the pipe support device is adapted to be removably secured to a building channel or like component, it is equipped with means for this purpose, and which means include bracket structure fixedly connected to the cradle so as to be rigidly related thereto and oriented so as to avoid interference with any conduit supported thereby. The bracket structure is equipped with fastener means which establish a releasable interconnection with the building component, and the particular form of such fastener means may vary somewhat depending upon the particular pipe support device, a small family or group thereof usually being provided to accommodate the variant building components and dispositions thereof encountered in building construction environments.

Embodiments of the invention are illustrated in the accompanying drawings, in which.

Figure 1:
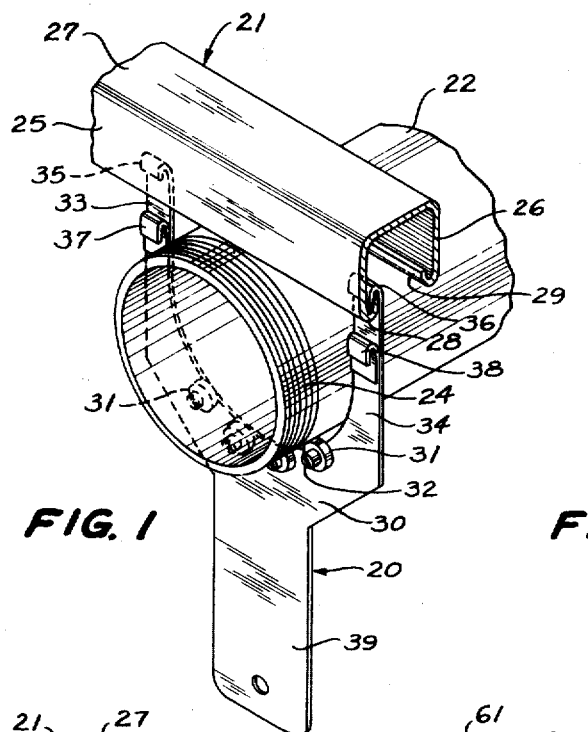
FIG. 1 is a broken perspective view illustrating one form of the pipe support device secured to a downwardly opening building channel component and supporting a pipe section in underlying relation therewith.

The temporary pipe or conduit support device illustrated in FIG. 1 is denoted in its entirety with the numeral 20, and it is adapted to be removably secured to a building component 21 so as to rotatably support a pipe or conduit 22 therefrom. As indicates hereinbefore, the conduit 22 may take variant forms, and a typical example thereof is the relatively large steel conduits or pipes used in electric wiring installations and which are sufficiently large to permit a rather large plurality of wires or insulated conductors to be located therein and mechanically protected and confined thereby. Such conduit sections are intended to be threadedly interconnected in end to end succession, and are threaded at the ends thereof as shown at 24. In the ordinary case, the building component 21 is a generally U-shaped channel having spaced apart legs 25 and 26 joined at one of their ends by a base wall 27 and respectively equipped at their free ends with inwardly turned lips 28 and 29. The channel component 21 may have various orientations such as the horizontally disposed downwardly opened disposition illustrated in FIG. 1, the horizontally disposed upwardly opening disposition illustrated in FIG. 5, and the vertically disposed orientation illustrated in FIG. 7. The channel component 21 will be supported in any appropriate manner which usually is by means of threaded rods (not shown) anchored to the support beams of a building structure and extending downwardly therefrom. Although the channel component 21 is usually spaced from the supporting building members, it can be in juxtaposition therewith.

The temporary pipe support 20 includes an open-mouthed cradle member 30 which may have an arcuate configuration as shown so as to generally correspond in internal configuration to the cylindrical peripheral surface of a conduit 22 to be supported thereby. Evidently, the radii of the cradle member 30 along the open mouth thereof will be somewhat greater than the outer radius of tee conduit 22 intended to be accommodated thereby. The cradle member 30 is equipped with a plurality of angularly spaced rollers 31 having peripheral surfaces that extend inwardly so as to freely engage the outer cylindrical surface of the pipe 22, thereby supporting the same for rotation about its longitudinal axis. In the form shown, the rollers 31 are journaled for rotation on pins 32 that define substantially parallel axes.

The support device 20 is also provided with means for removably securing the same to the building component 21 with the roller-equipped cradle 30 in position to underlie the conduit 22, as shown in FIG. 1. Such support means includes bracket structure fixedly connected with the cradle 30 so as to avoid interference with any such conduit 22 supported thereby, and in the device 20 such bracket structure comprises tranversely spaced and upwardly extending arms 33 and 34. The support means further includes fastener elements carried by the bracket structure for releasable interconnection with the building component 21, and in the device 20 such fastening elements are arranged in two sets of independent fastening means respectively comprising outer elements 35, 36 and inner elements 37, 38. Each of the fastener elements is a hook-shaped member dimensioned to receive one of the lips 28 or 29 of the channel component 21 therein, as is illustrated in FIG. 1. The fastener elements 35 and 37 are carried by the arm 33 in spaced apart relation, and the elements 36 and 38 are carried by the arm 34 in spaced apart relation.

It will be appreciated that the elements 35 and 36 are in alignment and cooperate in supporting the device 20 at one elevation relative to the building component 21, and that the elements 37 and 38 are similarly aligned and are adapted, in the alternative, to support the device 20 at a higher elevation relative to the building component 21. The fasteners 35 and 36 are formed integrally with the arms 33 and 34, respectively, which are formed integrally with cradle 30. The fasteners 37 ad 38 are separate elements spot welded or otherwise rigidly secured to the respectively associated arms 33 and 34. The device 20 is also provided with a handle or extension 39 which affords a convenient means for a workmen to hold the device while manipulating the same. The handle 39 may also be formed integrally with the cradle member 30.

Figure 2:
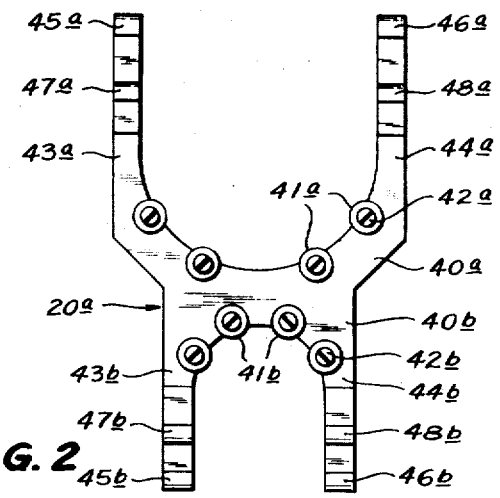
FIG. 2 is a face view in elevation of a modified form of pipe support device intended for use with conduits having different diameters.
Figure 3:
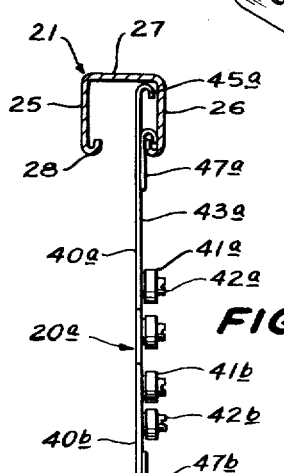
FIG. 3 is a side view in elevation of the device shown in FIG. 2 but being supported by a building channel component.

A modified temporary pipe support device 20a is illustrated in FIGS. 2 and 3, and it is essentially the same as the device 20 heretofore described except that it is provided with a pair of roller-equipped cradles each having means for removably securing one or the other of the cradles, selectively, to a channel component 21. In view of the similarities between the devices 20 and 20a, the same numerals are used to identify the respectively corresponding components except that the order of the numerals has been increased by 10. Also, differentiation is observed between the two cradle members an components respectively associated therewith by using the suffix a in one instance and b in the other instance.

Accordingly, the support device 20a has a cradle member 40a equipped with a plurality of rollers 41a respectively supported by pins 42a. Bracket arms 43a and 44a extend upwardly from the cradle 40a and are respectively equipped with hook-shaped fasteners 45a, 47a and 46a, 48a. The cradle member 40b provided by the device 20a is oriented in the opposite direction relative to the cradle 40a, and it is equipped with a plurality of rollers 41b respectively mounted on pins 42b; and with bracket arms 43b and 44b that are respectively provided with hook-shaped fasteners 45b, 47b and 46b, 48b. The fastener elements respectively associated with the two oppositely oriented cradles are arranged in cooperative pairs selectively engageable with a channel component 21, and the particular fastener elements used will depend upon the appropriate cradle member and proximity desired therefor relative to the channel component 21.

Thus, as shown in FIG. 3 the cradle member 40a has been selected to receive and support a conduit of a particular size, and the inner set of fastener elements 47a 48a have been used to secure the device 20a to the channel component 21. However, the outer fastener elements 45a, 46a could be used in the alternative to secure the device 20a to the channel component 21 with the cradle member 40a in position to receive a conduit. It is apparent that the cradles 40a and 40b have different radii with the latter being substantially smaller than the former. Evidently then, if a conduit of smaller diameter is to be supported by the device 20a, it would be inverted so as to position the cradle member 40b beneath the channel component 21 so as to receive such smaller conduit. Also, either of the fastener element sets 45b, 46b or 47b, 48b can be used to removably secure the device 20a to the channel component 21 with the cradle member 40b in appropriate position for receiving a conduit.

Figure 4:
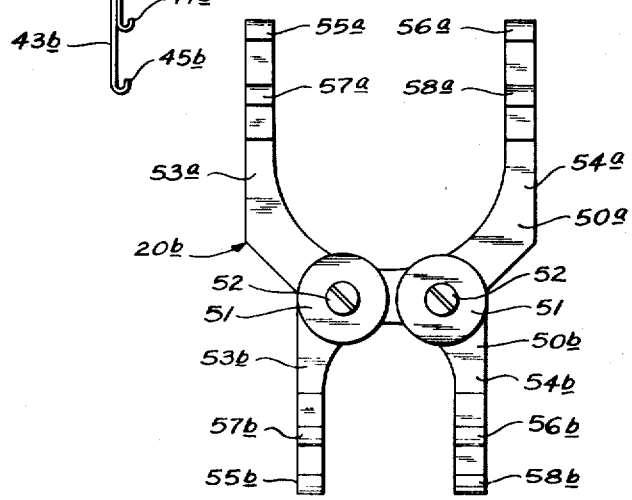
FIG. 4 is a face view in elevation of a further modified support device also adapted to accommodate conduit sections of different diameters.

A further modified pipe holder device is illustrated in FIG. 4 and is denoted in its entirety with the numeral 20b. The device 20b is substantially the same as the device 20a except that one set of rollers serves each of the cradle members. Because of the similarities, the same numerals are used to identify the respectively corresponding components except that the order thereof has been raised by 10 to the 50 series. The common rollers 51 total 2 in number and are each rotatably supported upon a pin 52 associated therewith. The diameters of the rollers 51 are sufficiently great to permit extension of the peripheral surfaces of the rollers into the arcuate confines of the cradle members 50a and 50b. The device 20b is used in exactly the same manner as the device 20a and, therefore, as a consequence of the structural and functional similarities, no further description of the device 20b will be set forth.

Figure 6:
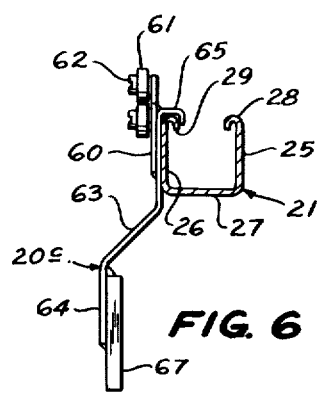
FIG. 6 is a side view in elevation of the support device shown in FIG. 5.
Figure 5:
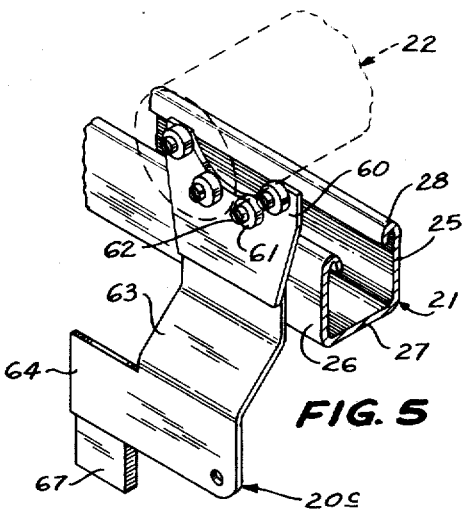
FIG. 5 is a broken perspective view illustrating another form of support device shown in association with an upwardly facing building channel component and with a conduit section denoted by broken lines.

As indicated hereinbefore, temporary pipe support devices embodying the present invention are also useful with channel components 21 that are horizontally disposed but have the open mouths thereof facing upwardly, as shown in FIGS. 5 and 6. The modified embodiment of the invention illustrated in these two figures is denoted in its entirety with the numeral 20c, and as respects the cradle and rollers provided therefor, it is generally the same as the devices heretofore described. Again for this purpose, the same numerals are used where appropriate to designate respectively corresponding components except that the order of such numerals has been increased to the 60 series. Thus, the cradle member 60 is equipped with a plurality of rollers 61 adapted to rotatably support a conduit 22 thereon, as shown in FIG. 5. The support means for removably securing the device 20c to the channel component 21 includes bracket structure 63 welded or otherwise fixedly secured to the cradle member 60 along one side thereof. The bracket structure 63 is turned laterally and downwardly to define a generally hooked-shaped fastener element 65 that is sufficiently wide to receive one of the channel lips therein, as shown in FIG. 6.

Figure 7:
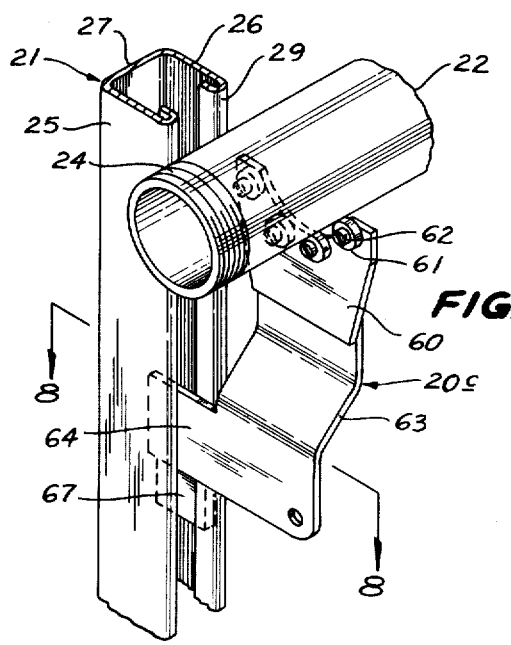
FIG. 7 is a broken perspective view of the device illustrated in FIGS. 5 and 6 but showing the same in association with a vertically disposed building channel component and supporting a conduit with respective thereto.
Figure 8:
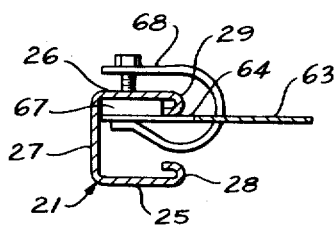
FIG. 8 is generally a transverse sectional view taken along the line 8—8 of FIG. 7 but including a clamp structure for constraining the device to such building channel.

The device 20c is also adapted to be removably secured to a channel component 21 which is vertically oriented, as depicted in FIGS. 7 and 8. For purposes of attachment to such vertical channel component, the bracket structure 63 is equipped with an arm 64 extending outwardly therefrom at generally right angles to the longitudinal axis thereof for insertion into the hollow interior of the vertically oriented building channel component 21. The arm 64 is rigidly related to the bracket structure 63 and may be formed integrally therewith, as in the device 20c shown. The arm 64 at the outer end thereof is equipped with a fastener element in the form of a clamp wing 67 which is welded to the arm and is oriented so as to extend along the channel component 21 in contiguous relation with the side wall 26 thereof. The wing element 67 has about the same thickness as the lip 29, as shown in FIG. 8, and is dimentioned to fit snugly between the lip 29 and back wall 27, thereby maintaining the device 20c in an upright position.

Suitable clamping means such as a C-clamp 68, locking wrench or pliers or other suitable fastener arrangement may be used to clamp the wing element 67 to the channel component 21, as shown in FIG. 8 (the clamp 68 being omitted in FIG. 7 for purposes of clarity). It will be apparent, that the device 20c can be clamped in any suitable elevation along the channel component 21, and that the roller-equipped member 60 functions in the manner heretofore described to support a conduit 22. Thus, the device 20c is able to serve as a temporary support for a conduit irrespective of wheather the channel component 21 is horizontally disposed with the open mouth thereof facing upwardly, or is vertically disposed, as shown in FIG. 7 and 8.

Figure 11:
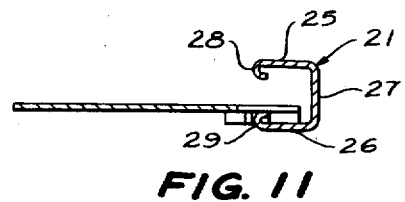
FIG. 11 is a transverse sectional view taken along the line 11—11 of FIG. 10.
Figure 9:
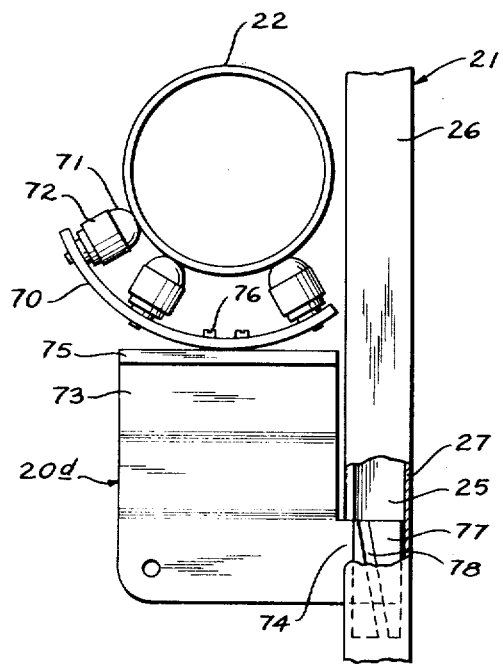
FIG. 9 is a face view in elevation of a variant form of support device showing the same in association with a vertically disposed building channel component and with a pipe or conduit of relatively large diameter being supported therefrom.
Figure 10:
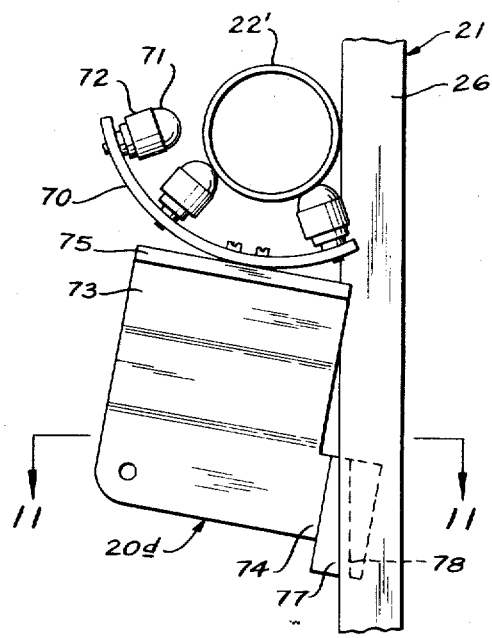
FIG. 10 is a face view in elevation similar to that of FIG. 9 but showing the support device in position to support a conduit of smaller diameter.

A further modified pipe support device is illustrated in FIGS. 9 through 11, and it is denoted in its entirety with the numeral 20d. The device 20d is quite similar to the device 20c in the sense that it is useful with both horizontally disposed, upwardly opening channel components (as shown in FIGS. 5 and 6) and with vertically oriented channel components (as shown in FIGS. 7 through 11). The device 20d differs from those heretofore described in two principal respects, one of which concerns the roller means which not only support a conduit 22 for rotational displacements around its longitudinal axis but also support such conduits for bodily displacements along the longitudinal axis thereof; and the other of which is that certain of the rollers are selectively engageable with conduits of different diameters, as is made evident by comparing FIGS. 9 and 10. The 70 series of the same numerals are used to identify the respectively corresponding components of the device 20d as were used to identify such components in the preceding embodiment.

The cradle member 70 is equipped with a plurality of angularly spaced rollers 71 which are in the form of balls or spheres and are respectively seated within socket-type races 72 fastened to the cradle member.

Thus, each ball-shaped roller 71 has universal displacements and can be rotated in any direction within the socket 72 therefor. The cradle member 70 is secured to the bracket structure 73 in any suitable manner, such as by means of cap screws 76. The bracket structure 73 is equipped with a fastener element 75 which has the hook-shaped configuration of the fastener element 65 shown in FIG. 6 and is adapted to seat upon the lip of one of the walls of a channel component 21. Adjacent its lower end, the bracket structure 73 is equipped with an arm 74 that projects laterally therefrom and which is provided with a fastener element in the form of a clamp wing 77 having an angularly disposed slot or channel 78 extending upwardly therethrough. The wing element 77 performs essentially the same function as the wing element 67 shown in FIGS. 7 and 8 and heretofore described, and accordingly, it has sufficient thickness so as to generally correspond to the thickness of the lip 29 on the wall 26, and it is also dimensioned so that when positioned as shown in FIG. 9, it seats within the space defined between the lip 29 and rear wall 27 of the channel component. It will be appreciated, that a C-clamp or other appropriate means must be employed to constrain the wing element 77 against the side wall 26 of the channel component.

In the orientation of the device 20d as shown in FIG. 9, the entire width of the wing element 77 is positioned between the lip 29 and rear wall 27, and the cradle member 70 and rollers 71 thereof are adapted to support a conduit 22 of relatively large diameter. The device 20d may be secured to the channel component 21 so as to be tipped or angled with respect thereto, as shown in FIG. 10, whereupon the cradle member 70 and rollers 71 thereof are adapted to support a conduit 22' of much smaller diameter. Inspection of FIGS. 10 and 11 makes it evident that the slot or groove 78 extending through the wing element 77 has sufficient width so as to seat the lip 29 therein. Since the slot 78 is angled, such seating of the lip 29 therewithin causes the device 20d to have the angular orientation relative to the channel component 21 that is shown in FIG. 10. In such orientation, the smaller conduit 22' is supported by the two inner most rollers 71 and the outer most rollers 71 is spaced from the conduit. In the configuration illustrated in FIG. 9, the larger conduit 22 is engaged by all of the rollers 71 so as to be supported thereon for both angular and longitudinal displacements relative to the channel component 21.

Figure 12:
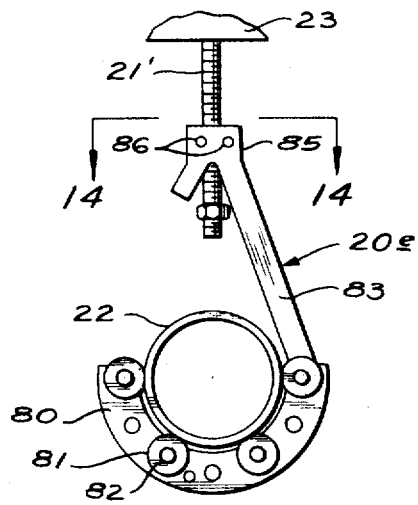
FIG. 12 is a face view in elevation of a further modified embodiment of the invention shown in association with a depending support rod.
Figure 13:
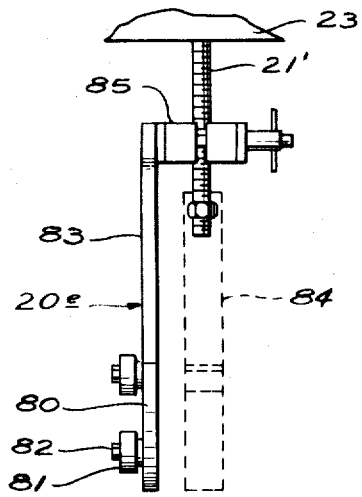
FIG. 13 is a side view in elevation of the device illustrated in FIG. 12, but with a permanent pipe support being shown in broken lines.
Figure 14:
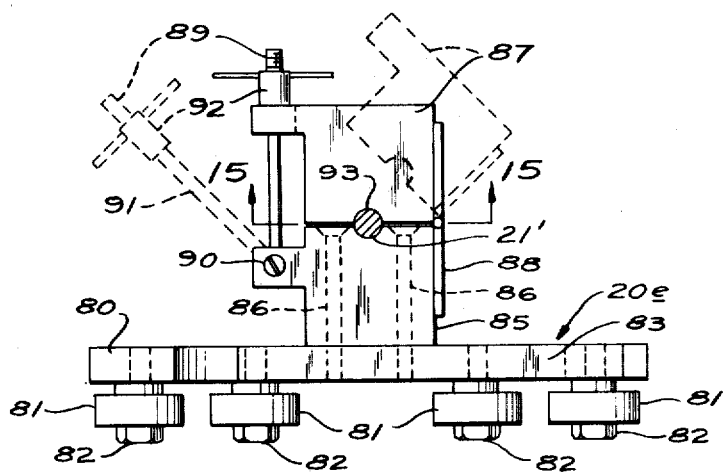
FIG. 14 is a transverse sectional view taken along the line 14—14 of FIG. 12, open positions of the fastener means being illustrated by broken lines.
Figure 15:
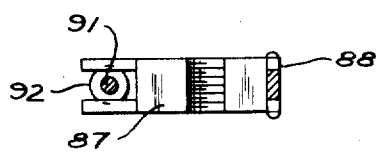
FIG. 15 is a transverse sectional view taken along the line 15—15 of FIG. 14.

A still further modified form of pipe support device as illustrated in FIGS. 12 through 15, and such modified device is generally denoted with the numeral 20e. The device 20e includes an arcuate cradle 80 equipped with a plurality of angularly spaced rollers 81 respectively supported by pins 82 threadedly or otherwise secured to the cradle. The rollers 81 are adapted to rotatably support a conduit 22, all as described hereinbefore. The device 20e is especially suited for use with building components in the form of depending straps or bolts 21' which are usually threaded and at their upper ends are anchored to an overlying beam 23 forming a part of the building structure. As explained hereinbefore, the pipe or conduit 22 is intended to be permanently attached to and be supported by the rod 21', and as shown in FIG. 13, a permanent hanger 84 is attached to the rod and is intended to encircle the conduit so as to support the same.

Bracket structure 83 is fixedly secured to the cradle member 80 and extends upwardly therefrom, as shown best in FIG. 12, and at its upper end it is equipped with fastener means that takes the form of a body element 85 fixedly connected to the upper free end portion of the bracket structure or arm 83, as by means of cap screws 86. A gate element 87 is pivotally connected to the body element 85 by a hinge structure 88, and the gate is selectively movable relative to the body element 85 between the closed and open positions respectively shown in FIGS. 14 by full and broken lines. Latch means 89 pivotally supported by the body element 85, as shown as 90, is selectively movable relative to the gate element 87 between the latch and release positions respectively shown in FIG. 14 by full and broken lines. The latch structure 89 includes a threaded shank 91 and a wing nut 92 mounted thereon which can be tightened against the facing surface of the gate element 87 so as to constrain the same in the closed position thereof. It will be evident that the body element 85 and gate element 87 define a generally cylindrical recess 93 therebetween which is dimensioned to receive the rod 21' therein and which is then frictionally gripped by the body and gate elements as the latch structure 89 is tightened.

Use of the pipe support devices is evident from the foregoing description, and in the case of a horizontally disposed building component 21 having the orientation shown in the FIGS. 1 and 3, an appropriate support device is attached to each of the spaced apart building components as necessary for support of a particular conduit section 22. In this respect, the building components 21 may be spaced apart by a distance of the order of 10 feet, and the length of a typical conduit section is approximately the same. Thus, usually two devices will be used to support each conduit section. Ordinarily, each conduit section is at least partially tightened with respect to the preceding section, but in any case, when a number of successive conduit sections have been properly secured one to another, the permanent pipe supports are secured thereto so that the temporary support devices can be removed. It may be observed that the temporary support devices are constructed and arranged so that they may remain in position to support a conduit section while the permanent support device is attached thereto and secured to the building component, and may be removed only thereafter.

In the case of a horizontally disposed building component 21 having the orientation shown in FIGS. 5 and 6, the support device is used in the same manner except that the fastener elements thereof overlie the entire inwardly turned lip of the building component. For vertically oriented conduits, the appropriate support devices is selected and it is secured to the building component at the desired location. Again, as many support devices are used as may be necessary to adequately support any particular length of conduits section.

The devices are lightweight, convenient to use, and are quite versitile in that certain of the devices can be used either with horizontally or vertically disposed building components, others can readily accommodate conduits of different diameters, and certain of the devices can selectively orient any particular conduits so as to be closer to or remote from any particular building component.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A temporary pipe support adapted to be removably secured to a generally U-shaped hollow building channel or like component, including: an open-mouthed cradle member equipped with a plurality of transversely spaced rollers adapted to engage the peripheral surface of a generally cylindrical conduit extending longitudinally through said cradle and support the same for rotational displacements about its longitudinal axis; and means for removably securing said pipe support to such building component with said cradle in position to underlie a conduit to be supported thereby, comprising bracket structure fixedly connected with said cradle so as to avoid interference with any such conduit supported thereby and including a pair of transversely spaced arms extending upwardly from said cradle on opposite sides thereof, fastener means carried by said bracket structure along said arms for releasable interconnection with such building component to removably secure said pipe support thereto, a second cradle member being provided so as to define a pair thereof having different sizes so as to selectively support conduits of different diameters, said cradle members being inverted with respect to each other and having the open mouths thereof facing in opposite directions, said bracket structure including a second pair of transversely spaced arms extending upwardly from said second cradle on opposite sides thereof, and second fastener means carried by said bracket structure along said second pair of arms for releasable interconnection with such building component, whereby said pipe support is selectively connectible with such building component in inverted positions in accordance with the size of the conduit to be supported thereby.

2. The pipe support of claim 1 in which each of said fastener means comprises two independent fastener structures selectively engageable with such building component so as to change the location of the associated cradle relative thereto.

3. The pipe support of claim 2 in which each of said fastener structures comprises a set of fastener structures respectively carried by said arms, each of said fastener structures being disposed with respect to the associated cradle so as to selectively interconnect said pipe support with a horizontally oriented building component.

4. The pipe support of claim 3 in which said rollers have circumferential edge portions thereof projecting into each of said cradles so as to engage and support a conduit extending therethrough.

5. The pipe support of claim 3 in which a second plurality of transversely spaced rollers are provided by said pipe support in operative association with said second cradle.

6. A temporary pipe support adapted to be detachably secured to a horizontally extending building component having at a lower end thereof an upwardly bent lip including: a generally planar unitary cradle member having a body portion provided with an opening for reception of a cylindrical pipe in perpendicular relation to the cradle member, said opening having an open side at the top through which the pipe may be inserted into or withdrawn from the cradle opening, a plurality of transversely spaced rollers mounted on the body of said cradle member with portions extending into said opening and arranged for engagement with the pipe for rotatably supporting the pipe in the opening, said cradle member having upwardly extending side arms at opposite sides of said opening generally coplanar with said body portion and extending above the opening, said arms having downwardly bent hook portions adjacent the upper end of said arms removably engageable within said lips to support said cradle member in vertical portion, said cradle member having a depending portion below said opening providing a handle for gripping the member.

* * * * *